(12) United States Patent
Yamamoto

(10) Patent No.: US 11,935,155 B2
(45) Date of Patent: Mar. 19, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keiichi Yamamoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 168 days.

(21) Appl. No.: 17/031,563

(22) Filed: Sep. 24, 2020

(65) Prior Publication Data
US 2021/0097732 A1   Apr. 1, 2021

(30) Foreign Application Priority Data
Sep. 30, 2019   (JP) .................. 2019-180970

(51) Int. Cl.
*G06T 7/11*   (2017.01)
*G06T 7/194*   (2017.01)
(Continued)

(52) U.S. Cl.
CPC .............. *G06T 11/001* (2013.01); *G06T 7/11* (2017.01); *G06T 7/194* (2017.01); *G06T 11/60* (2013.01);
(Continued)

(58) Field of Classification Search
CPC ......... G06T 7/11; G06T 7/194; G06T 11/001; G06T 11/60; G06T 2207/10024;
(Continued)

(56) References Cited

U.S. PATENT DOCUMENTS 6,559,975 B1 *   5/2003   Tolmer .................... H04N 1/56
358/1.9
7,760,936 B1 *   7/2010   King ..................... H04N 19/90
382/232
(Continued)

FOREIGN PATENT DOCUMENTS

CA   2769583 A1 *   2/2011   ......... G06K 9/00281
CN   1551624 A  *  12/2004   ......... H04N 21/4312
(Continued)

OTHER PUBLICATIONS

Kim et al. ("A Study on Face Masking Scheme in Video Surveillance System," Tenth International Conference on Ubiquitous and Future Networks; Date of Conference: Jul. 3-6, 2018) (Year: 2018).*
(Continued)

*Primary Examiner* — Yubin Hung
(74) *Attorney, Agent, or Firm* — Canon U.S.A., Inc. IP Division

(57) ABSTRACT

An information processing apparatus includes an extraction unit, a generation unit, and a combining unit. The extraction unit extracts a foreground object region from a captured image captured by an image capturing unit. The generation unit generates a mask image corresponding to the foreground object region in the captured image, and having colors different depending on luminance of the foreground object region. The combining unit combines a mask image generated by the generation unit and a predetermined image to generate an output image.

6 Claims, 15 Drawing Sheets

(51) Int. Cl.
*G06T 11/00* (2006.01)
*G06T 11/60* (2006.01)

(52) U.S. Cl.
CPC ............... *G06T 2207/10024* (2013.01); *G06T 2207/20221* (2013.01); *G06T 2207/30196* (2013.01); *G06T 2207/30232* (2013.01)

(58) Field of Classification Search
CPC . G06T 2207/20221; G06T 2207/30196; G06T 2207/30232
See application file for complete search history.

(56) References Cited

U.S. PATENT DOCUMENTS

| | | | | |
|---|---|---|---|---|
| 2008/0088807 | A1* | 4/2008 | Moon | H04N 9/3182 |
| | | | | 353/121 |
| 2008/0143739 | A1* | 6/2008 | Harris | G09G 5/377 |
| | | | | 345/604 |
| 2010/0067791 | A1* | 3/2010 | Dai | G06V 20/63 |
| | | | | 382/167 |
| 2012/0070055 | A1* | 3/2012 | Liu | G06T 7/0016 |
| | | | | 382/131 |
| 2012/0288150 | A1* | 11/2012 | Kido | G06V 10/143 |
| | | | | 382/103 |
| 2016/0171332 | A1* | 6/2016 | Kawano | G06V 20/52 |
| | | | | 382/173 |
| 2016/0313444 | A1* | 10/2016 | Kurata | G01S 13/931 |
| 2021/0052157 | A1* | 2/2021 | Wilson | A61B 3/0025 |

FOREIGN PATENT DOCUMENTS

| | | | | |
|---|---|---|---|---|
| CN | 105701756 | A * | 6/2016 | ......... G06K 9/00771 |
| CN | 108206953 | A * | 6/2018 | ........... H04N 19/105 |
| JP | 2006025061 | A | 1/2006 | |
| JP | 2015075914 | A | 4/2015 | |
| JP | 2016115214 | A | 6/2016 | |

OTHER PUBLICATIONS

Yu et al. ("Privacy protecting visual processing for secure video surveillance," 15th IEEE International Conference on Image Processing; Date of Conference: Oct. 12-15, 2008) (Year: 2008).*

* cited by examiner

WHEN AVERAGE LUMINANCE IS 128
AND STANDARD DEVIATION IS 83 — *800a*

| LUMINANCE VALUE OF CAPTURED IMAGE | PIXEL VALUE |
|---|---|
| 0 – 86 | (0, 85, 0) |
| 87 – 169 | (0, 170, 0) |
| 170 – 255 | (0, 255, 0) |

FIG.8B

WHEN AVERAGE LUMINANCE IS 69
AND STANDARD DEVIATION IS 56 — *800b*

| LUMINANCE VALUE OF CAPTURED IMAGE | PIXEL VALUE |
|---|---|
| 0 – 41 | (0, 85, 0) |
| 42 – 97 | (0, 170, 0) |
| 98 – 255 | (0, 255, 0) |

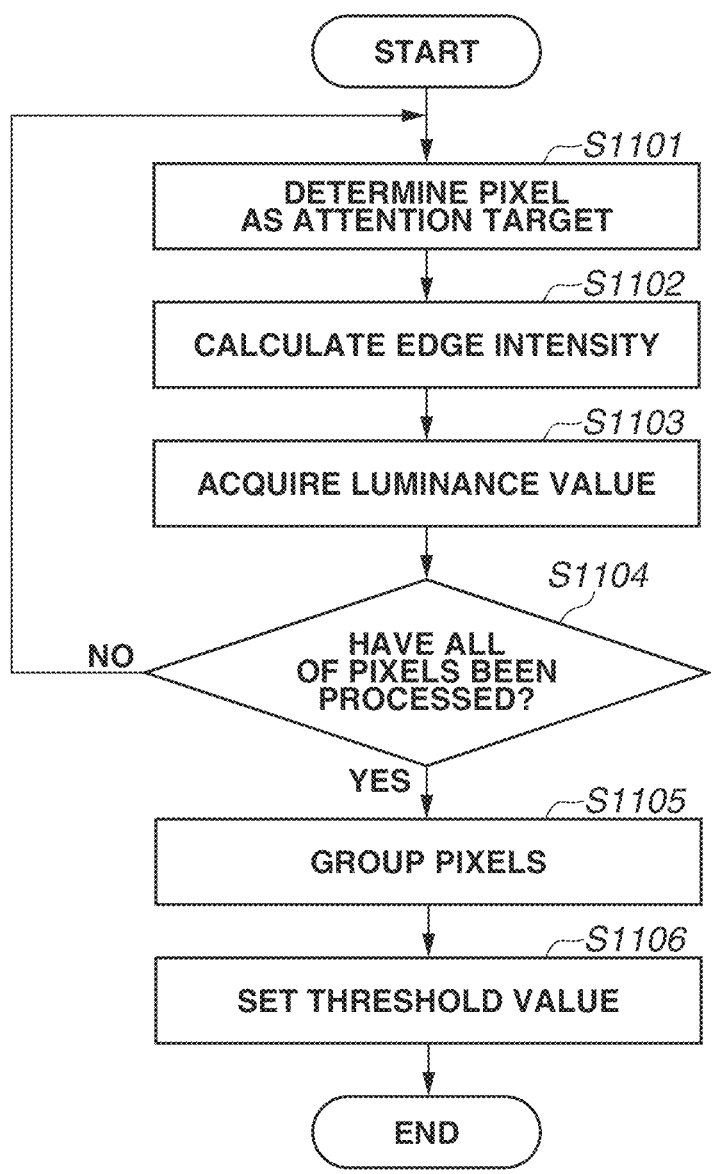

1202 1201 1203

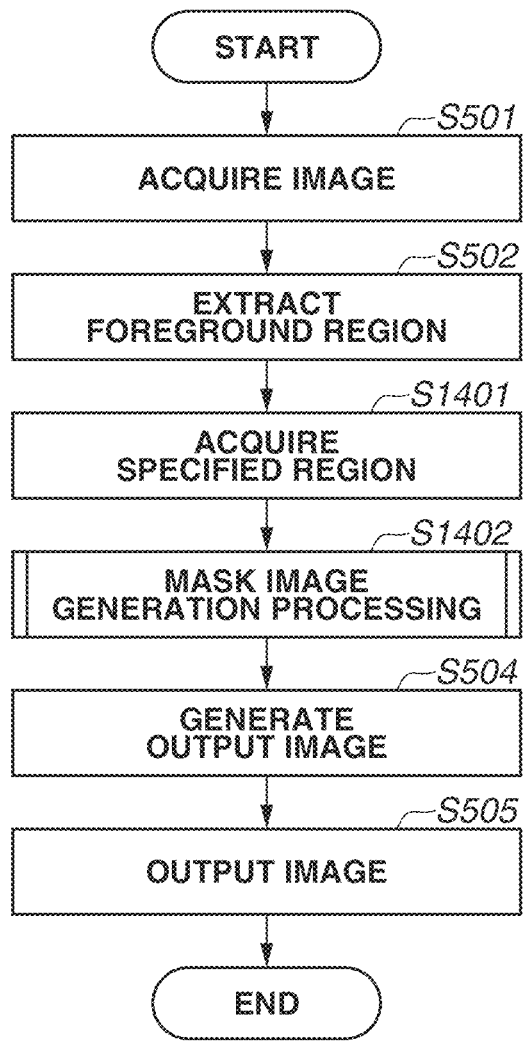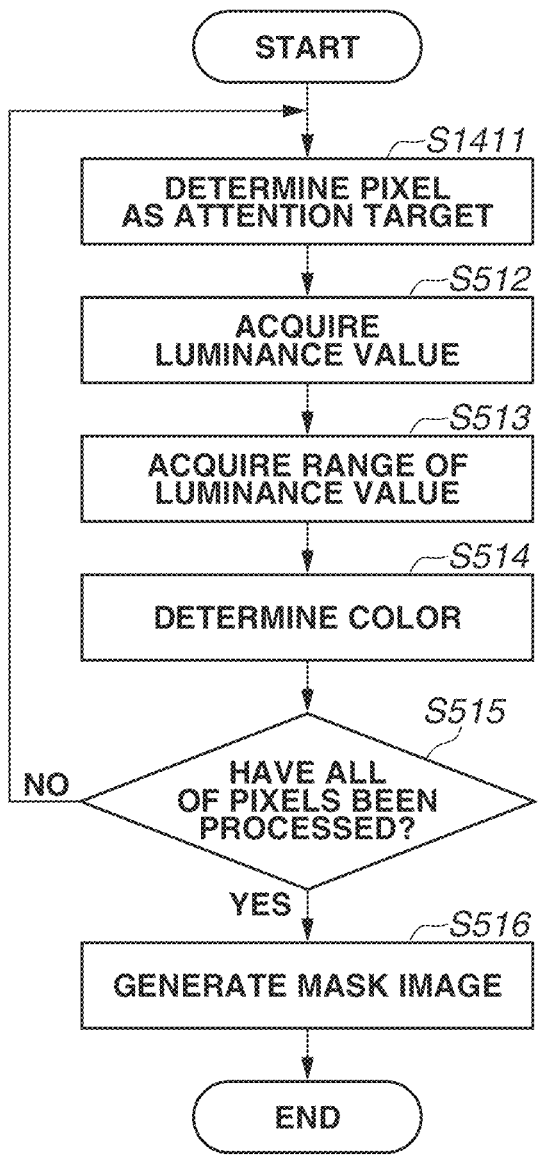

INFORMATION PROCESSING APPARATUS, INFORMATION PROCESSING METHOD, AND STORAGE MEDIUM

BACKGROUND

Field of the Disclosure

The present disclosure relates to an information processing technique.

Description of the Related Art

There has been an increase in the number of image capturing apparatuses installed for the purpose of surveillance. At the same time, more importance has been placed on protecting privacy of a person included in an image captured by the image capturing apparatus. Generally, the following technique is used as a method for protecting privacy of a person included in the captured image. In the technique, a captured image is compared with a background image, and a person included in the captured image is extracted as a foreground object region. Then, image processing for hiding the extracted foreground object region is executed, so that an output image with the privacy being protected is generated.

According to a technique discussed in Japanese Patent Application Laid-Open No. 2016-115214, a protection image is generated by combining a predetermined image (single-color image) with a specific region (protection region) that is specified based on a comparison between a background image and a processing target image acquired after the background image is generated or updated.

However, with the technique discussed in Japanese Patent Application Laid-Open No. 2016-115214, a boundary between persons extracted as a foreground object region may not be recognizable when a single-color image is used as an image to be combined with the extracted foreground object region. Particularly, in a case where a place crowded with many people is captured in an image, many people may be extracted as a mass of foreground objects. In such a case, if a region corresponding to that foreground objects is filled with a single color, the user cannot easily recognize what object is captured in the image, although each person can be prevented from being identified. Accordingly, although privacy thereof can be protected, a situation in a captured image cannot be figured out easily.

SUMMARY

According to an aspect of the present disclosure, an information processing apparatus includes an extraction unit configured to extract a foreground object region from a captured image captured by an image capturing unit, a generation unit configured to generate a mask image corresponding to the foreground object region in the captured image, and having colors different depending on luminance of the foreground object region, and a combining unit configured to combine the mask image generated by the generation unit and a predetermined image to generate an output image.

Further features of the present disclosure will become apparent from the following description of exemplary embodiments with reference to the attached drawings.

BRIEF DESCRIPTION OF THE DRAWINGS

FIGS. 8A and 8B are tables illustrating gradation threshold values.

FIG. 11 is a flowchart illustrating a flow of processing for setting a gradation threshold value.

FIGS. 14A and 14B are flowcharts illustrating processing for generating a mask image.

DESCRIPTION OF THE EMBODIMENTS

Hereinafter, exemplary embodiments according to the present disclosure will be described with reference to the appended drawings. The configuration described in the exemplary embodiments described below is merely an example, and the present disclosure is not limited to the configuration illustrated in the appended drawings.

Figure 1:
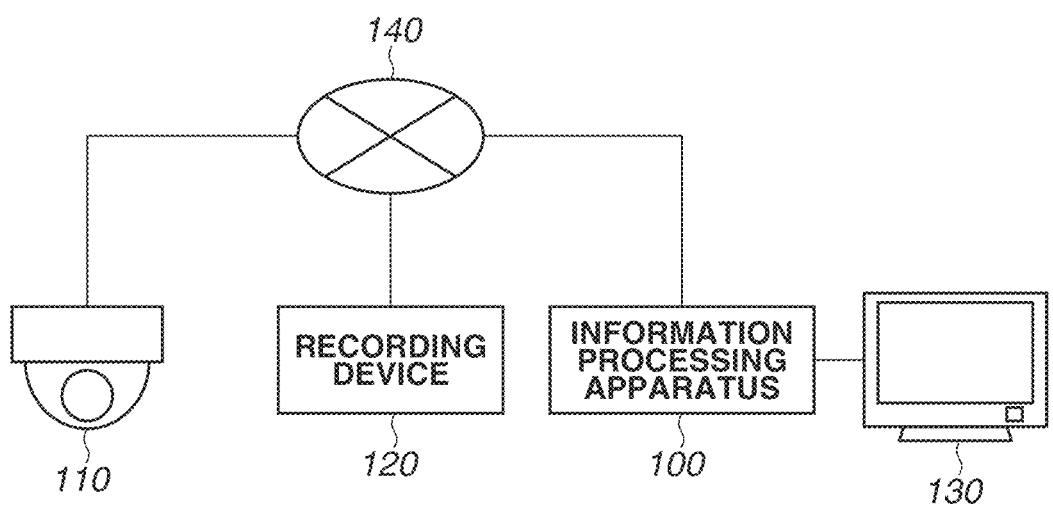
FIG. 1 is a diagram illustrating an example of a system configuration.

FIG. 1 is a diagram illustrating a system configuration according to a first exemplary embodiment. The system in the present exemplary embodiment includes an information processing apparatus 100, an image capturing apparatus 110, a recording device 120, and a display 130.

The information processing apparatus 100, the image capturing apparatus 110, and the recording device 120 are connected to each other via a network 140. The network 140 is configured of a plurality or routers, switches, and cables compliant with a communication standard such as the Ethernet®.

In addition, the network 140 may be configured of the internet, a wired local area network (LAN), a wireless LAN, and/or a wide area network (WAN).

For example, the information processing apparatus 100 can be a personal computer in which a program for executing the information processing function described below is installed.

The image capturing apparatus 110 is an apparatus for capturing an image. The image capturing apparatus 110 transmits image data of the captured image, in association with information about a captured time when the image is captured and identification information that identifies the image capturing apparatus 110, to an external apparatus such as the information processing apparatus 100 or the recording device 120 via the network 140. In addition, while the system according to the present exemplary embodiment includes one image capturing apparatus 110, the system may include a plurality of image capturing apparatuses 110.

The recording device 120 records the image data of the image captured by the image capturing apparatus 110 in association with the information about a captured time when the image is captured and the identification information that identifies the image capturing apparatus 110. Then, in response to a request from the information processing apparatus 100, the recording device 120 transmits the recorded data (e.g., the image and the identification information) to the information processing apparatus 100.

The display 130 is configured of a liquid crystal display (LCD), and displays a result of information processing executed by the information processing apparatus 100 and the image captured by the image capturing apparatus 110. The display 130 is connected to the information processing apparatus 100 via a display cable compliant with a communication standard such as the High Definition Multimedia Interface (HDMI®).

The display 130 functions as a display unit, and displays the image captured by the image capturing apparatus 110 and an information processing result described below. In addition, all or at least any two of the display 130, the information processing apparatus 100, and the recording device 120 may be arranged in a single housing. Further, the information processing apparatus 100 and the image capturing apparatus 110 may be arranged in a single housing. In other words, the image capturing apparatus 110 may have a function and a configuration of the information processing apparatus 100 described below.

In addition, a result of information processing executed by the information processing apparatus 100 and an image captured by the image capturing apparatus 110 may be displayed on a display included in the following external apparatus other than the display 130 connected to the information processing apparatus 100 via a display cable. More specifically, the information processing result and the captured image may be displayed on a display included in a mobile device such as a smartphone or a tablet terminal connected thereto via the network 140.

Next, information processing executed by the information processing apparatus 100 according to the present exemplary embodiment will be described with reference to functional blocks of the information processing apparatus 100 according to the present exemplary embodiment illustrated in FIG. 2.

Figure 2:
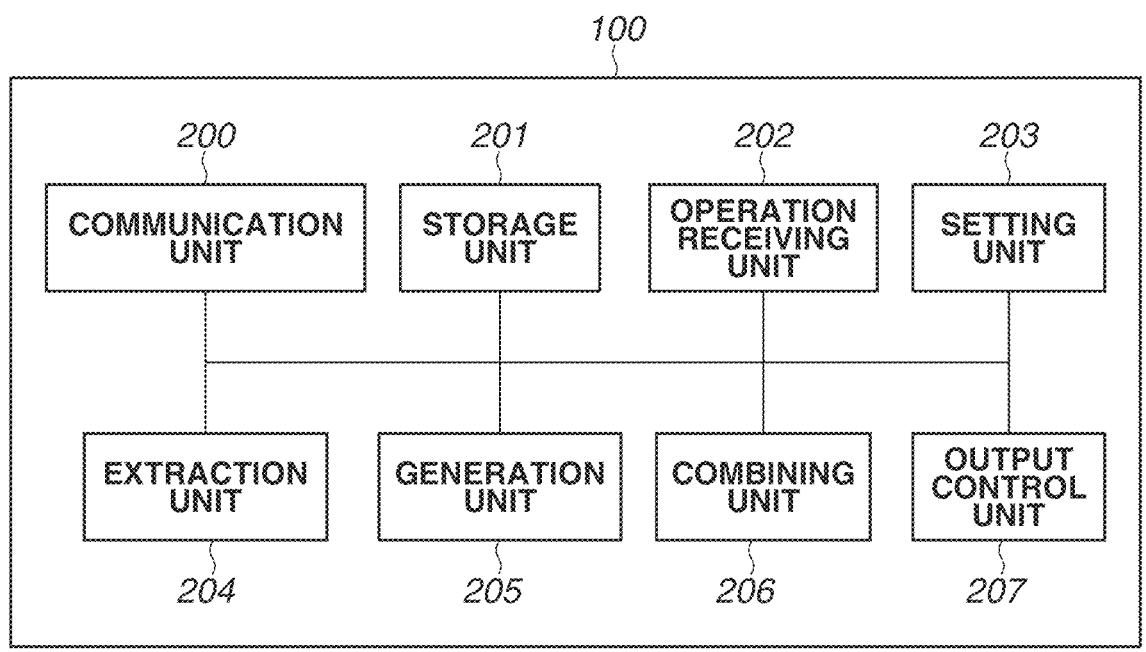
FIG. 2 is a block diagram illustrating a function of an information processing apparatus.
Figure 15:
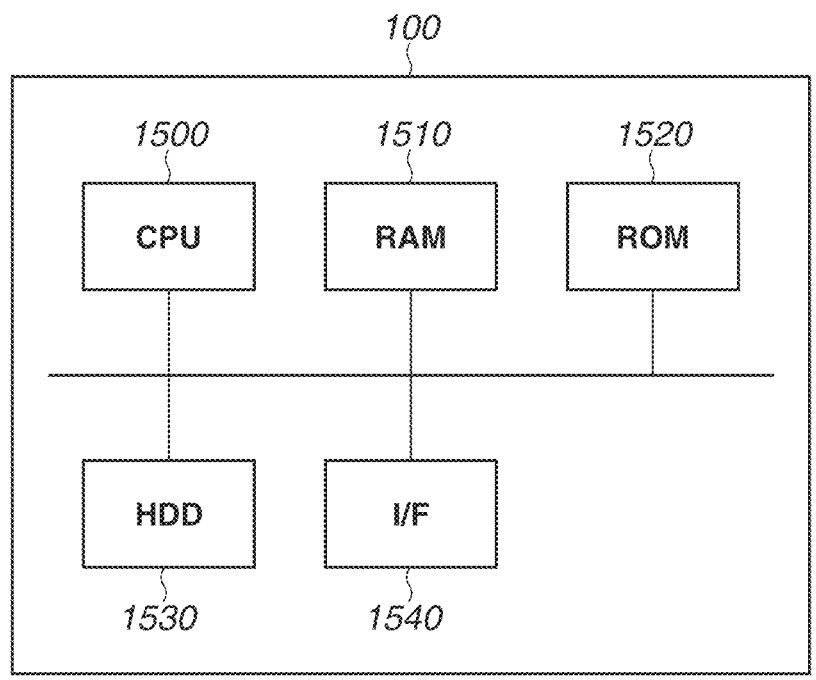
FIG. 15 is a block diagram illustrating a hardware configuration of an apparatus.

In the present exemplary embodiment, respective functions illustrated in FIG. 2 are implemented as follows by using a read only memory (ROM) 1520 and a central processing unit (CPU) 1500 described below with reference to FIG. 15. The CPU 1500 of the information processing apparatus 100 executes a computer program stored in the ROM 1520 of the information processing apparatus 100 to implement the respective functions in FIG. 2.

A communication unit 200 can be implemented by an interface (I/F) 1540 described below with reference to FIG. 15, and communicates with the image capturing apparatus 110 and the recording device 120 via the network 140. For example, the communication unit 200 receives image data of an image captured by the image capturing apparatus 110 and transmits a control command for controlling the image capturing apparatus 110 to the image capturing apparatus 110. For example, the control command includes a command for instructing the image capturing apparatus 110 to capture an image.

A storage unit 201 can be implemented by a random access memory (RAM) 1510 or a hard disk drive (HDD) 1530 described below with reference to FIG. 15, and stores information and data relating to information processing executed by the information processing apparatus 100. For example, the storage unit 201 stores a background image generated by a generation unit 205 described below.

An operation receiving unit 202 receives operation executed by a user via an input device (not illustrated) such as a keyboard or a mouse. For example, the operation receiving unit 202 receives user operation for specifying a background image used for extracting a foreground object region from a captured image.

When a mask image corresponding to a foreground object region is to be generated, a setting unit 203 sets a range of luminance values used for determining a color of the mask image. The setting unit 203 according to the present exemplary embodiment sets values previously specified by a user as a range of luminance values. A threshold value used for determining a color of the mask image will be described below in detail.

An extraction unit 204 extracts a foreground object region (hereinafter, referred to as a "foreground region") included in a captured image captured by the image capturing apparatus 110. Specifically, for example, the extraction unit 204 compares a captured image and a background image to extract a foreground region included in the captured image. The following processing is executed as an extraction method of a foreground region executed by the extraction unit 204 according to the present exemplary embodiment. The extraction unit 204 extracts the foreground region by making the foreground region that represents a region as a difference from the background region as "1", and another region as "0". In this case, for example, the extraction unit 204 calculates a difference value between the values of a pixel in the background image and a pixel in the captured image. Then, the extraction unit 204 sets "1" that represents a foreground region to a pixel having the calculated difference value equal to or greater than a threshold value, and sets 0 to a pixel having the calculated difference value less than the threshold value, so that the foreground region can be extracted. In addition, the background image used by the extraction unit 204 to extract the foreground region is an image without including a specific object regarded as a privacy protection target (i.e., hiding target). In the present exemplary embodiment, an image without including a person is used as a background image.

The extraction unit 204 according to the present exemplary embodiment extracts a foreground region included in a captured image by comparing a background image and a captured image through a background differencing method. However, an extraction method is not limited thereto. For example, the extraction unit 204 may detect a specific object such as a person from a captured image to extract a region of the detected specific object as a foreground region. In addition, a known technique can be used for generating a background image. For example, the background image may be generated through the following processing. Specifically, a person is detected from a captured image, and a background image is generated by using an image of a region other than a region of the detected person. With respect to a portion within the acquired image where a foreground is not captured for a certain period of time, the pixel of the background is updated with a current pixel value. However, the background image may be generated by another method as long as the image close to the current state that does not include a moving object can be acquired.

A generation unit 205 generates a mask image corresponding to the foreground region extracted by the extraction unit 204, having colors different depending on the luminance of the foreground region. More specifically, the generation unit 205 determines a color used for generating a mask image for each of divided regions of the foreground region in the captured image, and generates the mask image by using the color determined for each of the divided regions. The generation unit 205 according to the present exemplary embodiment fills each of the divided regions with any one of three colors depending on the luminance of the foreground region divided into a plurality of divided regions and generates a mask image. The processing of generating the mask image executed by the generation unit 205 will be described below in detail.

A combining unit 206 combines the mask image generated by the generation unit 205 and a predetermined image to generate an output image to be displayed on a display unit such as the display 130. For example, the combining unit 206 according to the present exemplary embodiment generates an output image by combining the mask image generated by the generation unit 205 and the background image used for extracting the foreground region. However, the output image is not limited thereto. For example, the combining unit 206 may generate an output image by combining the generated mask image and the captured image regarded as a current processing target. Further, the combining unit 206 may generate an output image by combining the generated mask image and a background image different from the background image used for extracting the foreground region.

An output control unit 207 outputs the output image generated by the combining unit 206 to an external device such as the recording device 120 or the display 130. At this time, for example, the output control unit 207 displays the output image generated by the combining unit 206 on the display 130.

Figure 3A:
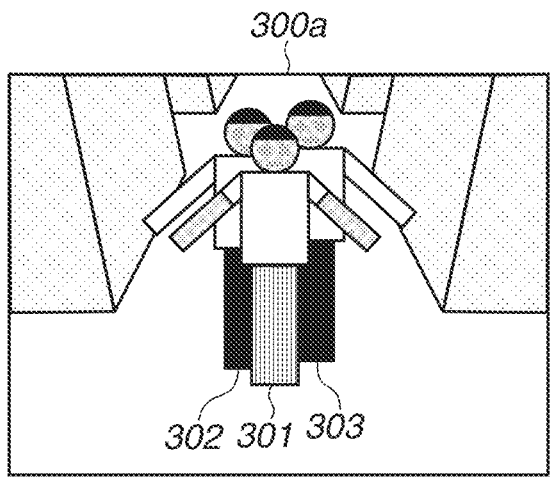
FIGS. 3A, 3B, 3C, and 3D are diagrams illustrating processing for generating a mask image.
Figure 3B:
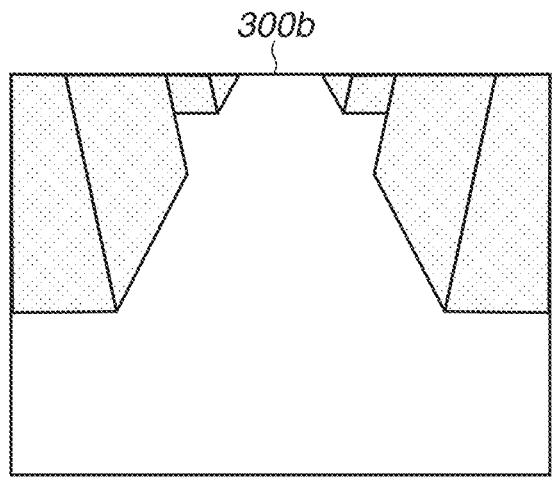
Figure 3C:
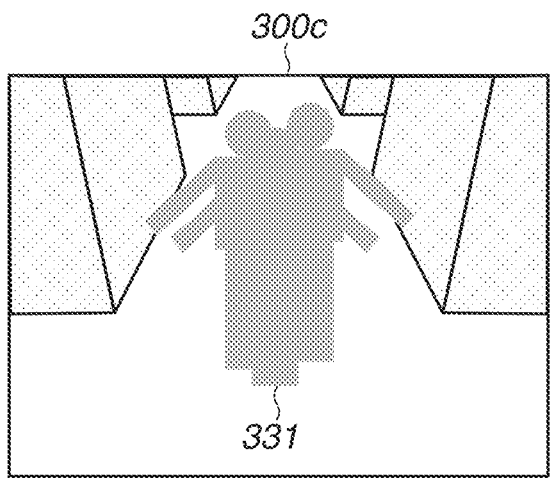
Figure 3D:
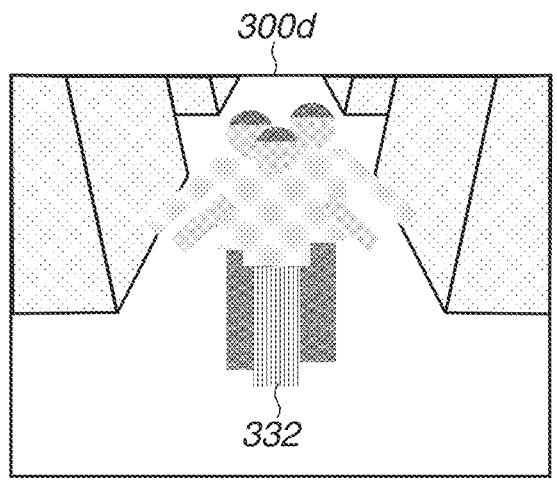
Figure 4:
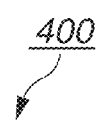
FIG. 4 is a table illustrating a gradation threshold value.

Next, information processing according to the present exemplary embodiment executed by the information processing apparatus 100 will be described with reference to FIGS. 3A, 3B, 3C, and 3D, and FIG. 4. FIG. 3A is a diagram illustrating a captured image 300a that is a current processing target captured by the image capturing apparatus 110. As illustrated in FIG. 3A, three persons 301 to 303 are included in the captured image 300a. FIG. 3B is a diagram illustrating a background image 300b used for extracting a foreground region from the captured image 300a, and a person as a hiding target is not included therein. The extraction unit 204 according to the present exemplary embodiment compares the captured image 300a and the background image 300b to extract the persons 301 to 303 as a foreground object region (i.e., foreground region). FIG. 3C is a diagram illustrating an output image generated by combining a mask image 331 and the background image 300b. The mask image 331 is generated by filling the foreground region extracted in this way with a single color. As illustrated in FIG. 3C, because the mask image 331 is in a single color, persons included in the captured image cannot be identified from the output image 300c. Accordingly, although privacy thereof can be protected, the user cannot easily recognize what object is captured in the image.

On the other hand, the generation unit 205 according to the present exemplary embodiment generates a mask image in three gradation levels depending on the luminance of each of divided regions of the foreground region. In other words, depending on the luminance of each of the divided regions of the foreground region, the generation unit 205 fills each of the divided regions with any one of the three colors to generate a mask image 332. Then, the combining unit 206 generates an output image 300d by combining the mask image 332 and the background image 300b. The output image 300d generated as described above is illustrated in FIG. 3D.

Now, processing for generating a mask image corresponding to a foreground region executed by the generation unit 205 according to the present exemplary embodiment will be described. In the present exemplary embodiment, when a mask image corresponding to the foreground region in the captured image is to be generated, the generation unit 205 generates a mask image in three gradation levels. More specifically, each of the pixels in the foreground region in the captured image is regarded as a divided region, and the generation unit 205 fills each pixel in the foreground region with any one of the three colors depending on the luminance of the pixel to generate a mask image. At this time, the generation unit 205 generates a mask image with reference to a table 400 in FIG. 4 that describes divisions of gradation used for generating a mask image. A column of luminance values in the table 400 describes three divided ranges of luminance values when luminance of the captured image can take a value falling within a range of 0 to 255. In the present exemplary embodiment, a first range is a range from 0 to 85, a second range different from the first range is a range from 86 to 170, and a third range different from the first and the second range is a range from 171 to 255. Further, a column of pixel values in the table 400 describes red-green-blue (RGB) values of a mask image corresponding to each of the three ranges of luminance values.

The generation unit 205 refers to the table 400 and determines a first color (R=0, G=85, B=0) as a color of a pixel having a luminance value included in the first range, from among the pixels in the foreground region. Further, the generation unit 205 determines a second color (R=0, G=170, B=0) different from the first color as a color of a pixel having a luminance value included in the second range, from among the pixels in the foreground region. Further, the generation unit 205 determines a third color (R=0, G=255, B=0) different from the first and the second color as a color of a pixel having a luminance value included in the third range. In a case where the captured image 300a as illustrated in FIG. 3A is captured, the values R=0, G=85, and B=0 are set as the pixel values of the hair of the persons 301 to 303 in the mask image because the luminance values thereof are included in the first range of 0 to 85. Further, the values R=0, G=85, and B=0 are set as the pixel values of trousers of the persons 302 and 303 in the mask image because the luminance values thereof are also included in the first range of 0 to 85. The values R=0, G=170, and B=0 are set as the pixel values of the faces of the persons 301 to 303 and a skin color portion of the arm and trousers of the person 301 in the mask image because the luminance values thereof are included in the second range of 86 to 170 even though the respective portions have different colors. Further, the values R=0, G=255, and B=0 are set as the pixel values of shirts of the persons 301 to 303 in the mask image because the luminance values thereof also included in the third range of 171 to 255.

The generation unit 205 according to the present exemplary embodiment generates a mask image in three gradation levels. However, it is not limited thereto. For example, in a case where a mask image is generated in N-gradation levels ("N" is an integer), the information processing apparatus 100 divides a possible range of luminance values of the captured image into N-pieces of ranges, and retains a table in which a different color is associated with each of the N-pieces of ranges. Then, based on the table, the generation unit 205 fills each of the divided regions with any one of N-colors depending on the luminance value of the divided region to generate a mask image. At this time, in a case where "N" takes a large value, in other words, in a case where various colors different depending on the luminance are used for generating a mask image corresponding to a person included in the image, shapes of the eyes and the nose of that person may be recognizable. Therefore, the number of gradation levels should not be too large. In addition, the number of gradation levels may be set by the user.

Figure 5A:
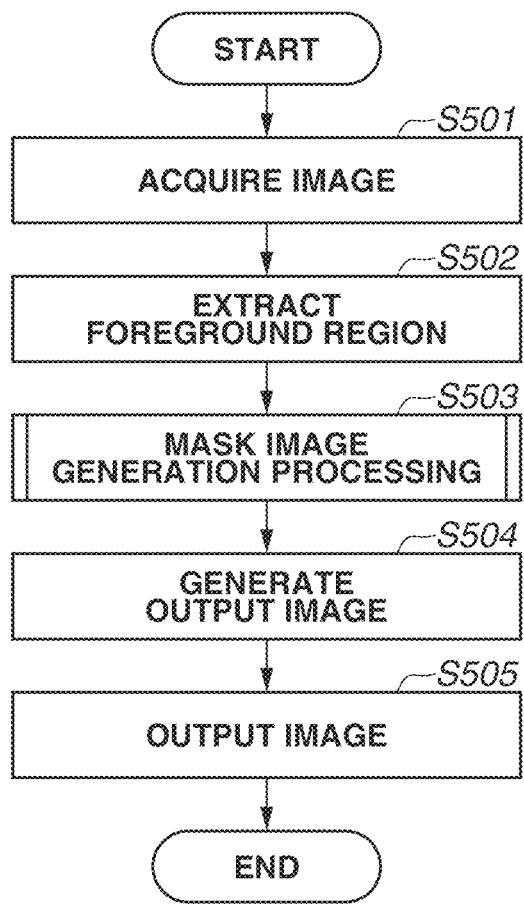
FIGS. 5A and 5B are flowcharts illustrating flows of processing for generating a mask image.
Figure 5B:
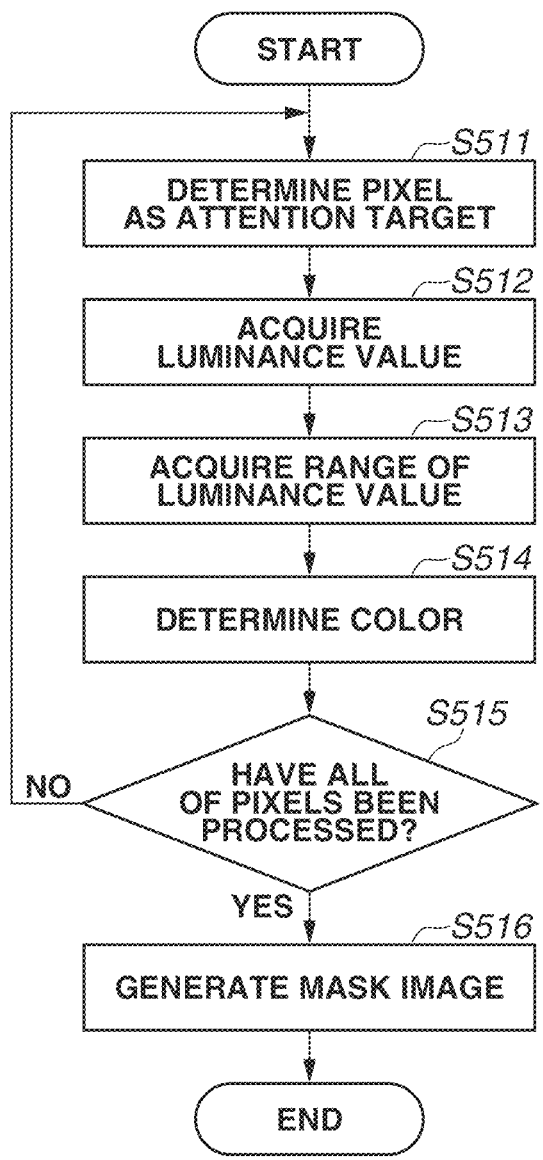

Next, processing for generating an output image according to the present exemplary embodiment will be described with reference to FIGS. 5A and 5B. FIG. 5A is a flowchart illustrating processing for generating a mask image corresponding to a foreground region extracted from a captured image and generating an output image by combining the mask image and a predetermined image. Further, FIG. 5B is a flowchart illustrating processing for generating a mask image having colors different depending on the luminance of the foreground region. The processing in FIGS. 5A and 5B is executed by the functional blocks illustrated in FIG. 2 implemented by the CPU 1500 of the image capturing apparatus 110 by executing a computer program stored in the ROM 1520 or the HDD 1530 of the information processing apparatus 100.

The processing illustrated in FIG. 5A will be described. First, in step S501, the communication unit 200 acquires a captured image to be a processing target captured by the image capturing apparatus 110.

Then, in step S502, the extraction unit 204 extracts a foreground object region from the captured image as a processing target. More specifically, for example, the extraction unit 204 compares the captured image and a background image to extract a foreground region included in the captured image. In step S503, the generation unit 205 executes generation processing for generating a mask image having colors different depending on the luminance of the foreground object region extracted by the extraction unit 204 in step S502. Details of the generation processing executed by the generation unit 205 in step S503 will be described with reference to FIG. 5B.

Next, in step S504, the combining unit 206 generates an output image to be displayed on a display unit by combining the mask image generated by the generation unit 205 and a predetermined image. For example, the combining unit 206 according to the present exemplary embodiment generates the output image by combining the mask image generated by the generation unit 205 and the background image used for extracting the foreground region. However, the output image is not limited thereto, and the combining unit 206 may generate an output image by combining the generated mask image and the captured image as a current processing target. Further, the combining unit 206 may generate an output image by combining the generated mask image and a background image different from the background image used for extracting the foreground region.

Next, in step S505, the output control unit 207 outputs the output image generated by the combining unit 206 to an external device such as the recording device 120 or the display 130. At this time, for example, the output control unit 207 displays the output image generated by the combining unit 206 on the display 130.

Herein, processing for generating a mask image executed in step S503 will be described in detail with reference to FIG. 5B. First, in step S511, from among the pixels constituting the foreground region in the captured image extracted by the extraction unit 204 in step S502, the generation unit 205 determines a pixel as an attention target. In the present exemplary embodiment, from among the pixels constituting the foreground region that have not been determined as the attention target, a pixel as an attention target is determined in the following order. The generation unit 205 determines a pixel as an attention target by sequentially scanning the foreground region in the order from a pixel at an uppermost left end to a pixel at a right end, moving to a pixel at a left end of a next row when reaching the right end, and similarly scanning the foreground region in the order from a pixel at a left end to a pixel at a right end. Then, the scanning is ended when a pixel at a right end of the lowermost row is reached, from among the pixels constituting the foreground region. In the present exemplary embodiment, one pixel is selected from a plurality of pixels constituting the foreground region. However, it is not limited thereto. For example, the foreground region may be divided into a plurality of divided regions, and one divided region is selected from the plurality of divided regions. At this time, a divided region includes at least two or more pixels.

Next, in step S512, the generation unit 205 acquires a luminance value of a pixel as an attention target determined in step S511 from the captured image as a processing target acquired in step S501. In step S513, with reference to the table 400 in FIG. 4, the generation unit 205 acquires information about a range of pixel values to be used for determining a color of the mask image. In the example illustrated in FIG. 4, the generation unit 205 acquires pieces of information about the first range of 0 to 85, the second range of 86 to 170, and the third range of 171 to 255.

Next, in step S514, from among the plurality of ranges of luminance values acquired in step S512, the generation unit 205 determines a range in which the luminance value of the pixel as an attention target is included, and determines a color of the pixel as the attention target based on the determination result. For example, if the luminance value of the pixel as the attention target is 70, the luminance value thereof is included in the first range, so that the generation unit 205 determines the first color (R=0, G=85, B=0) corresponding to the first range as a color of the pixel.

In step S515, the generation unit 205 determines whether attention has been paid to all of the pixels of the foreground region extracted from the processing target. If the generation unit 205 determines that attention has been paid to not all of the pixels of the foreground region extracted from the processing target (NO in step S515), the processing proceeds to step S511. In step S511, the generation unit 205 determines a pixel as a next attention target from among the pixels that have not been determined as the attention target. Then, the processing in steps S512 to S515 is executed repeatedly with respect to the pixel determined to be the next attention target in step S511. On the other hand, in step S515, if the generation unit 205 determines that attention has been paid to all of the pixels of the foreground region extracted from the processing target (YES in step S515), the processing proceeds to step S516. In step S516, the generation unit 205 generates a mask image corresponding to the foreground region based on the colors determined for the respective pixels in the foreground region. In other words, the generation unit 205 generates a mask image having colors different depending on the luminance values of pixels of the foreground object region in the captured image. After the mask image is generated in step S516, in step S504 illustrated in FIG. 5A, the combining unit 206 generates an output image by combining the generated mask image and a predetermined image. Then, in step S505, the output control unit 207 outputs the output image generated by the combining unit 206 to the external device such as the recording device 120 or the display 130.

As described above, through the processing illustrated in FIG. 5B, the mask image corresponding to the foreground object region in the captured image and having colors different depending on the luminance values of the foreground object region in the captured image is generated. In a case where a place crowded with many people is captured in an image, many people may be extracted as a mass of foreground objects. In such a case, if a region corresponding to that foreground objects is filled with a single color, the user cannot easily recognize what object is captured in the image, although each person can be prevented from being identified. On the other hand, as in the present exemplary embodiment, a mask image having colors different depending on the luminance values of the captured image is generated. In this way, in a case where persons extracted as foreground objects have different luminance values, existence of a plurality of persons can be recognized from the generated mask image although each person cannot be identified. As a result, it is possible to generate an output image that allows the user to figure out a situation such as the number of people captured in the captured image while protecting privacy of the people included in the captured image.

In the first exemplary embodiment, when a mask image corresponding to a foreground region is to be generated, the mask image having colors different depending on luminance values of the foreground region in the captured image is generated. At this time, if a person is extracted as a foreground region, for example, a luminance value of a small region such as the eyes or the nose may be lower than a luminance value of a region of the skin of the person's face. In such a case, in the first exemplary embodiment, when a mask image corresponding to the foreground region is generated, in a facial region of the person extracted as a foreground region, a color determined as a color of the mask image corresponding to the eyes, the nose, and the mouth may be different from a color determined as a color of the mask image corresponding to a skin region. In this case, the mask image corresponding to the person extracted as the foreground object has the color of the eyes, the nose, and the mouth different from the color of the skin portion, so that a facial expression of that person is recognizable. As a result, there is a case where privacy of that person cannot be protected. Then, in order to solve the above-described problem, in a second exemplary embodiment, a color of a comparatively small region such as the eyes, the nose, or the mouth is corrected based on a color of the periphery of the region.

In the following description, a portion different from the first exemplary embodiment will be mainly described, the same reference numerals are applied to the constituent elements and the processing similar or equivalent to those of the first exemplary embodiment, and duplicate descriptions thereof will be omitted.

The generation unit 205 according to the present exemplary embodiment executes the following processing after determining the colors to be used for respective pixels in the mask image corresponding to the foreground region. Specifically, in a case where a size of a small region having the first color is smaller than or equal to a threshold value and colors determined for the regions in the periphery of the small region are the same, the color of the small region is corrected to the second color.

Figure 6A:
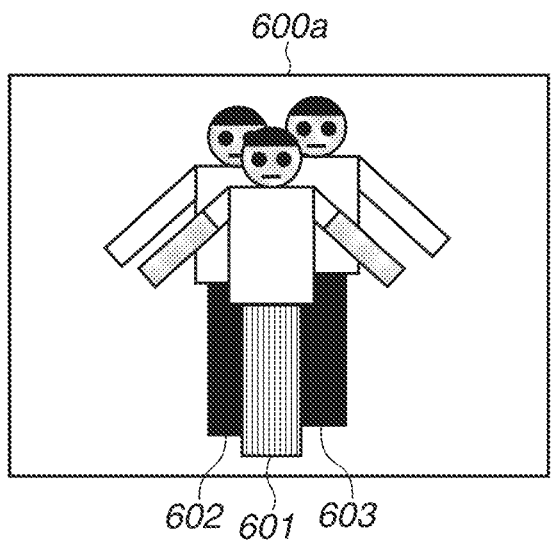
FIGS. 6A, 6B, and 6C are diagrams illustrating processing for generating a mask image.

FIG. 6A is a diagram illustrating a captured image 600*a* that is a current processing target captured by the image capturing apparatus 110. As illustrated in FIG. 6A, three persons 601 to 603 are included in the captured image 600*a*.

Figure 6B:
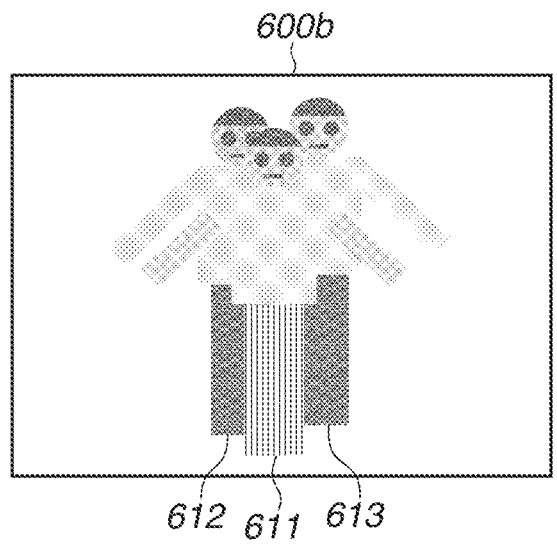

FIG. 6B is a diagram illustrating a mask image corresponding to a region of the persons 601 to 603 (i.e., foreground region) extracted as foreground objects from the captured image 600*a*, having colors different depending on luminance values of pixels in the region. In this example, portions such as the eyes and the mouths regarded as facial features have colors different from a color of a skin portion of the face, so that persons can be identified easily.

Figure 6C:
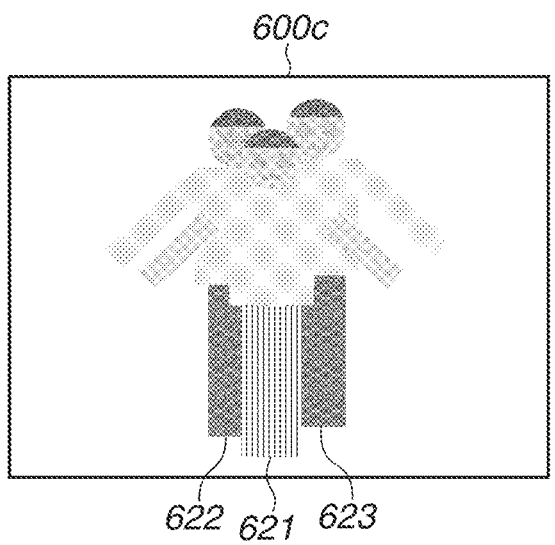

FIG. 6C is a diagram illustrating an example of a mask image generated by the generation unit 205 according to the present exemplary embodiment, and the color of a small-size region such as the eyes or the mouth is corrected to the color of the peripheral region. In this way, since a region of the eyes or the mouse, which is more likely to reflect facial features, is filled with a color of the peripheral region (i.e., a color of a facial skin portion), a mask image corresponding to the facial portion is generated with a single color, so that an individual person captured in the image will be less identifiable.

Figure 7A:
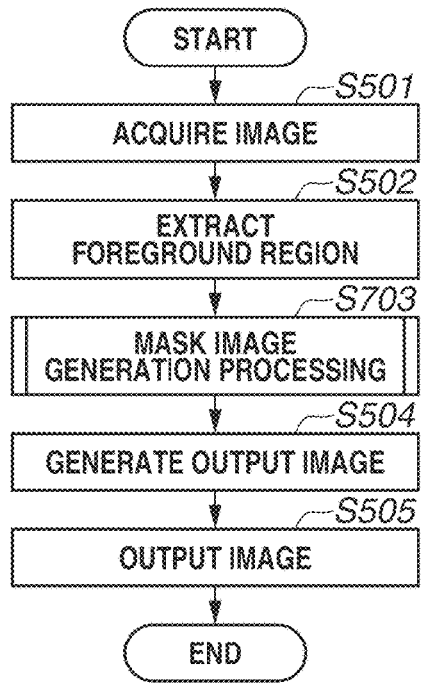
FIGS. 7A and 7B are flowcharts illustrating flows of processing for generating a mask image.
Figure 7B:
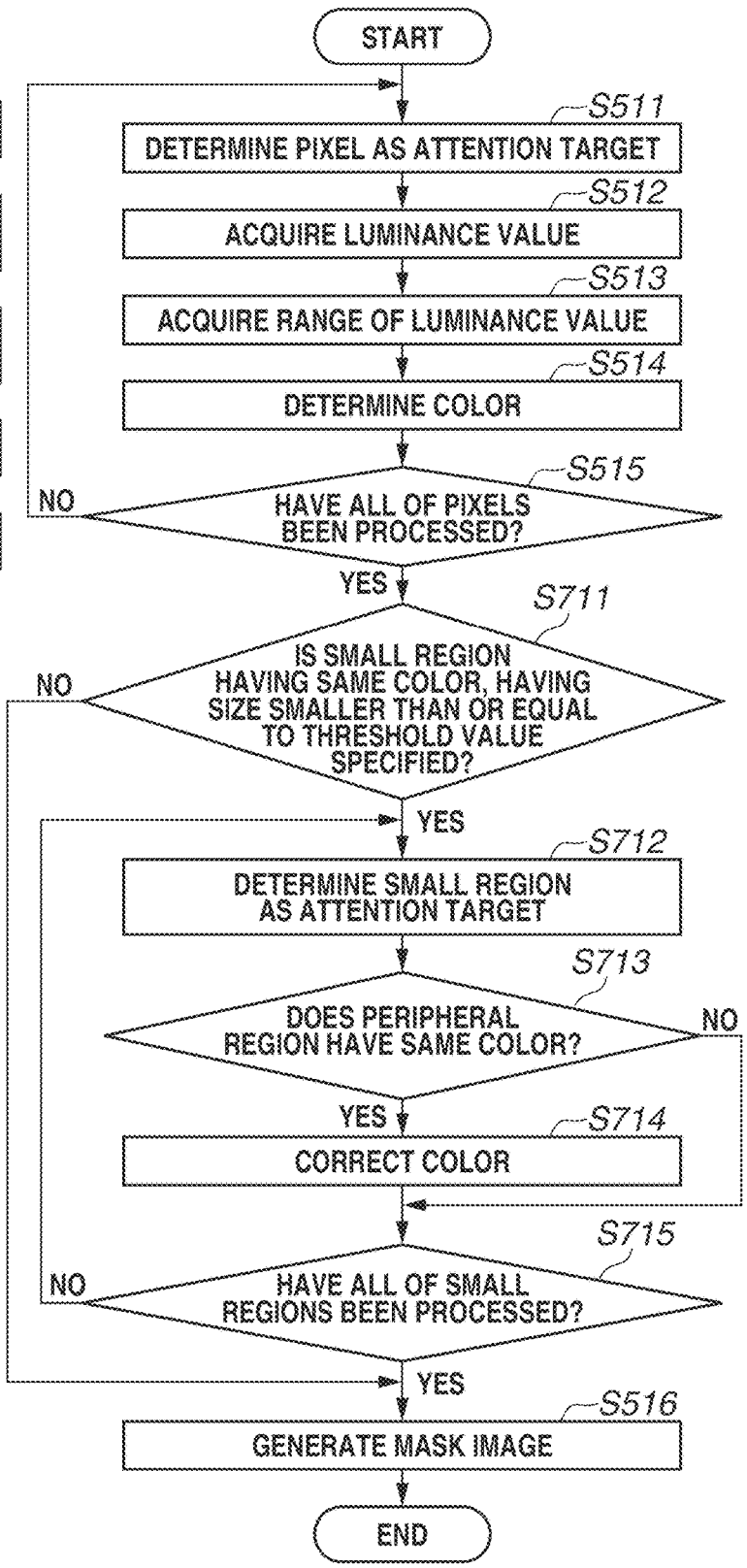

Herein, information processing executed by the information processing apparatus 100 according to the present exemplary embodiment will be described with reference to the flowcharts in FIGS. 7A and 7B. In the processing, the information processing apparatus 100 generates a mask image, and generates an output image generated by combining the generated mask image and a predetermined image. FIG. 7A is a flowchart illustrating the processing for generating a mask image corresponding to a foreground region extracted from a captured image and generating an output image by combining the mask image and a predetermined image. Further, FIG. 7B is a flowchart illustrating the processing for generating a mask image having colors different depending on the luminance values of the foreground region, in which a color of a small region different from a peripheral color is corrected. The processing in FIGS. 7A and 7B is executed by the functional blocks illustrated in FIG. 2 implemented by the CPU 1500 of the image capturing apparatus 110 by executing a computer program stored in the ROM 1520 or the HDD 1530 of the information processing apparatus 100.

The processing in steps S501 and S502 in FIG. 7A is similar to the processing described with reference to FIG. 5A, so that descriptions thereof will be omitted. In step S703 in FIG. 7A, the generation unit 205 executes generation processing for generating a mask image corresponding to the foreground region. Herein, the generation processing for generating a mask image executed by the generation unit 205 according to the present exemplary embodiment will be described in detail with reference to FIG. 7B.

The processing in steps S511 to S515 in FIG. 7B is similar to the processing described with reference to FIG. 5B, so that descriptions thereof will be omitted. After the color is determined for each of divided regions constituting the foreground region in step S514, in step S711, the generation unit 205 specifies a small region having a size smaller than or equal to a threshold value from among small regions each of which consists of adjacent divided regions having the same color. In the present exemplary embodiment, after the color is determined for each of pixels constituting the foreground region, a small region having a size smaller than or equal to the threshold value is specified from among the small regions each of which consists of adjacent pixels having the same color. If a small region having the same color, and having a size less than or equal to the threshold value is specified (YES in step S711), the processing proceeds to step S712. On the other hand, if a small region having the same color and having a size less than or equal to the threshold value is not specified (NO in step S711), the processing proceeds to step S516. In step S516, a mask image is generated based on the colors of pixels determined in step S514. In other words, if a determination result is "NO" in step S711, the processing similar to the processing of the first exemplary embodiment is executed.

Next, in step S712, the generation unit 205 determines a small region to be an attention target from among the small regions specified in step S711. In a case where a plurality of small regions is specified, the generation unit 205 sequentially determines an attention target from a small region at a position closer to the upper left side of the image.

In step S713, the generation unit 205 determines whether colors of the regions in the periphery of the small region to be the attention target determined in step S514 are the same. In the present exemplary embodiment, the generation unit 205 determines whether colors of pixels adjacent to the small region as the attention target, determined in step S514, are the same. In the present exemplary embodiment, the generation unit 205 determines whether the color determined for the pixels adjacent to the small region is the same color. However, it is not limited thereto. For example, when the number of pixels having the same color, adjacent to the small region, is a predetermined value or more, the generation unit 205 may determine that the colors determined for the regions in the periphery of the small region are the same. In this case, the generation unit 205 determines that the colors determined for the regions in the periphery of the small region are not the same in a case where the number of pixels having the same color and adjacent to the small region is less than the predetermined value.

In step S713, if the colors determined for the regions in the periphery of the small region as an attention target are the same (YES in step S713), the processing proceeds to step S714. In step S714, the generation unit 205 changes the color determined for the small region to the color of the peripheral region. In other words, the generation unit 205 generates a mask image in which the small region is filled with the color determined for the region in the periphery of the small region. For example, when the first color (R=0, G=85, B=0) is determined for the small region, and the second color (R=0, G=170, B=0) is determined for the pixels adjacent to the small region, the generation unit 205 corrects the color of the small region to the second color.

In step S713, if a color determined for the peripheral regions of the small region as the attention target is not the same color (NO in step S713), the processing proceeds to step S715. In step S715, if the generation unit 205 determines that not all of small regions having a size less than or equal to the threshold value are determined as the attention target (NO in step S715), the processing proceeds to step S712. In step S712, the generation unit 205 determines a small region having a size less than or equal to the threshold value as a next attention target. On the other hand, in step S715, if all of the small regions having a size less than or equal to the threshold value is determined as the attention target (YES in step S715), the processing proceeds to step S516. In step S516, based on the color determined in step S514 or the color determined in step S514 and corrected in step S714, the generation unit 205 generates a mask image corresponding to the foreground object region.

After the processing in step S516, in step S504 in FIG. 7A, the combining unit 206 generates an output image by combining the generated mask image and a predetermined image. Then, in step S505, the output control unit 207 outputs the output image generated by the combining unit 206 to an external device such as the recording device 120 or the display 130.

As described above, in a case where a size of the small region having the first color is smaller than or equal to the threshold value, and the colors determined for the regions in the periphery of the small region are the same, the information processing apparatus 100 of the present exemplary embodiment corrects the color determined for the small region to the second color. In this way, since a region of the eyes or the mouse that is more likely to reflect facial features is filled with a color of the peripheral region (i.e., a color of a skin portion of the face), a mask image corresponding to the facial portion has a single color, so that an individual person captured in the image is less identifiable.

In the first and the second exemplary embodiments, when the mask image corresponding to the foreground region is generated, a range of luminance values used for determining the color of the mask image is previously specified by the user. In a third exemplary embodiment, the information processing apparatus 100 sets a range of luminance values used for determining a color of a mask image based on the luminance value of the captured image. In addition, a range of luminance values may be determined by using an image previously prepared by the user instead of using the captured image. In the present exemplary embodiment described below, a portion different from the first exemplary embodiment will be mainly described, the same reference numerals are applied to the constituent elements and the processing similar or equivalent to those of the first exemplary embodiment, and duplicative descriptions thereof will be omitted.

When a mask image corresponding to the foreground object region is to be generated, the setting unit 203 sets a range of luminance values used for determining the color of the mask image based on the acquired luminance value of the captured image. The setting processing for setting a range of luminance values may be executed by the setting unit 203 at an optional timing. For example, if there is only a small change in the luminance of the captured images throughout a day, the processing for setting a range of luminance values may be executed only once, so that the range of luminance values set thereto is used continuously. On the other hand, if there is a great change in the luminance of the captured images captured at different times, for example, a range of luminance values may be set and updated for a predetermined number of frames.

Herein, setting processing of a luminance range executed by the setting unit 203 according to the present exemplary embodiment will be described with reference to FIGS. 8A and 8B. FIGS. 8A and 8B are tables illustrating ranges of luminance values set based on an average luminance value and a standard deviation of the luminance value of the captured image.

FIG. 8A is a table illustrating ranges of luminance values set when an average value of luminance values (average luminance) and a standard deviation of luminance values of all of pixels constituting a captured image is 128 and 83 respectively. Herein, although an average luminance of all of the pixels is used, an average luminance of pixels constituting a part of the region in the captured image can be also used. In the present exemplary embodiment, a mask image gradated in three gradation levels is taken as an example, and threshold values (hereinafter, called "gradation threshold values") as dividing points for dividing the range of luminance values are calculated through the following formulas.

Gradation Threshold Value1=Average−Standard Deviation/2

Gradation Threshold Value2=Average+Standard Deviation/2

By applying the corresponding values to the above formulas, in FIG. 8A, gradation threshold values 1 and 2 are acquired as 86 and 169 respectively. However, formulas are not limited thereto, and any formulas can be used as long as the gradation threshold values can be calculated with consideration for a distribution state of luminance values such as dispersion or bias thereof. More specifically, an interval between the gradation threshold values 1 and 2 should be adjusted based on the dispersion of luminance values, and magnitude of the gradation threshold values 1 and 2 should be set based on the bias of luminance values.

FIG. 8B is a table illustrating an example of ranges of luminance values set by using a captured image having luminance values smaller than and distributed more densely than the luminance values of the captured image used for setting the range of luminance values (i.e., the gradation threshold values) in FIG. 8A. Herein, an average luminance value of all of pixels constituting the captured image is 69, and a standard deviation of luminance values of all of the pixels is 56. In this case, by applying the corresponding values to the above formulas, the gradation threshold values 1 and 2 are acquired as 41 and 97 respectively. The gradation threshold values 1 and 2 are lowered because the average luminance value is low, and an interval between the gradation threshold values 1 and 2 is reduced because the standard deviation is small. Accordingly, even if the foreground region has narrowly-distributed dark luminance values, gradation threshold values can be appropriately set thereto, so that a mask image can be generated by gradating the foreground region. As described above, although the information processing apparatus 100 calculates and acquires the range of luminance values used for determining the color of the mask image through the above-described formulas, the range of luminance values may be acquired through the following method. Specifically, a plurality of tables each having an average luminance value and a standard deviation as illustrated in FIGS. 8A and 8B may be previously stored, so that the information processing apparatus 100 acquires a range of luminance values with reference to the table having the average luminance value and the standard deviation acquired from the captured image.

As described above, the information processing apparatus 100 according to the present exemplary embodiment determines a range of luminance values used for determining the colors of the mask image based on the luminance value of the captured image that is a processing target. In this way, a range of luminance values used for determining the color of the mask image can be set more appropriately.

In a fourth exemplary embodiment, a range of luminance values used for determining a color of a mask image is set based on edge information extracted from a captured image and information about a pixel in a vicinity of the edge. In addition, the edge information of a captured image is information about a difference between a luminance value of a pixel as a boundary line of an object included in the captured image and a luminance value of a pixel adjacent to that pixel (hereinafter, referred to as "edge intensity"). When the edge intensity is higher, a difference between luminance values of adjacent pixels is greater, so that the edge is the definite boundary.

Hereinafter, the information processing apparatus 100 according to the present exemplary embodiment will be described. In the following description, a portion different from the above-described exemplary embodiments will be mainly described. The same reference numerals are applied to the constituent elements and the processing similar or equivalent to those of the exemplary embodiments, and duplicate descriptions thereof will be omitted.

Figure 9A:
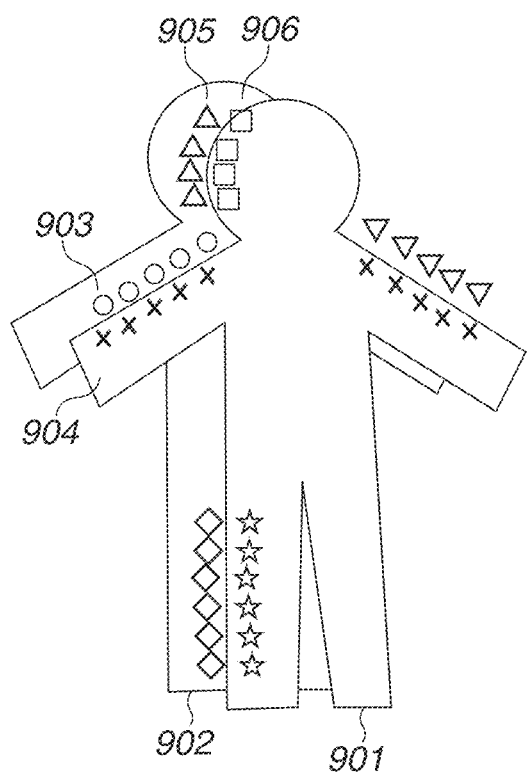
FIGS. 9A, 9B, and 9C are diagrams illustrating processing for setting a gradation threshold value.
Figure 9B:
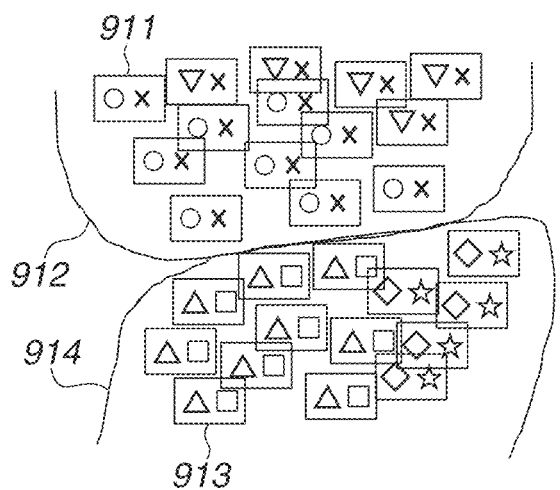
Figure 9C:
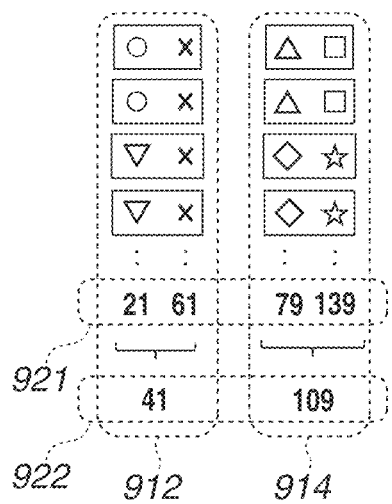

FIGS. 9A, 9B, and 9C are diagrams illustrating setting processing for setting a range of luminance values used for determining colors of a mask image based on edge information extracted from a captured image and information about a pixel in a vicinity of the edge. FIG. 9A is a diagram illustrating two persons included in the captured image. A person 901 stands in front of a person 902. Pixels 903 to 906 are pixels arranged on both sides of pixels serving as an edge. Pixels 903 and 904 are respectively arranged on the upper and the lower sides of the edge in a vertical direction of an image. The pixels 903 are positioned on the upper side of the edge. The pixels 904 are positioned on the lower side of the edge. Pixels 905 and 906 are respectively arranged on the right and left sides of the edge in a horizontal direction of the image. A pair of a circle mark and a cross mark and a pair of an inverted-triangle mark and a cross mark in FIG. 9A represent pixels arranged on the upper and lower sides of the edge in the vertical direction of the image. A pair of a triangle mark and a square mark and a pair of a diamond mark and a star mark represent pixels arranged on the right and left sides of the edge in the horizontal direction of the image. Further, it is assumed that pixels expressed by a same symbol mark have substantially equivalent luminance values.

The extraction unit 204 according to the present exemplary embodiment extracts an edge from the captured image. In the present exemplary embodiment, the extraction unit 204 extracts the edge from the captured image by using a Prewitt filter or a Sobel filter. In addition, any known technique may be used as a method of extracting the edge from the captured image as long as luminance values of pixels arranged on both sides of the edge can be acquired thereby. Further, a pixel that is not an edge, i.e., a pixel of noise or subtle change of color, can be eliminated by eliminating a pixel having a low edge intensity.

The setting unit 203 acquires luminance values of pixels arranged on both sides of the edge extracted from the captured image in the vertical direction or the horizontal direction of the captured image as illustrated in FIG. 9A. In the present exemplary embodiment, luminance values and edge intensities of the pixels arranged on both sides of the edge are acquired.

FIG. 9B is a diagram illustrating a state where the pixels having similar luminance values, which are arranged on both sides of the edge acquired in FIG. 9A, are grouped. More specifically, pixels having similar small luminance values and similar large luminance values, which are arranged on both sides of the edge, are grouped. Through the above processing, the pixels arranged on both sides of the edge, having substantially the same luminance values, are grouped. In the present exemplary embodiment, two gradation threshold values are necessary in order to gradate the mask image in three gradation levels. Therefore, the number of pixel groups is two. Because the number of groups is determined previously, the K-Means method may be used as a grouping method. However, the method is not limited thereto. Luminance values 911 of the pixels arranged on both sides of the edge correspond to the luminance values of the pixels 903 (circle marks) and the pixels 904 (cross marks) in FIG. 9A, and belong to a group 912. Similarly, in the present exemplary embodiment, luminance values of the pixels corresponding to inverted-triangle marks and cross marks arranged on both sides of the edge also belong to the group 912. On the other hand, luminance values 913 of the pixels arranged on both sides of the edge correspond to the luminance values of the pixels 905 (triangle marks) and the pixels 906 (square marks) in FIG. 9A, and belong to a group 914. Similarly, in the present exemplary embodiment, luminance values of the pixels corresponding to diamond marks and star marks arranged on both sides of the edge also belong to the group 914.

FIG. 9C is a diagram illustrating an example of a method of setting a gradation threshold value from luminance values of grouped pixels arranged on both sides of the edge. Values surrounded by a dashed line 921 represent an average of small luminance values and an average of large luminance values for each group of pixels arranged on both sides of the edge. In the group 912, an average of small luminance values and an average of large luminance values of pixels arranged on both sides of the edge are 21 and 61, respectively. Further, in the group 914, an average of small luminance values and an average of large luminance values of pixels arranged on both sides of the edge are 79 and 139, respectively. Each of values surrounded by a dashed line 922 represents an average of the average of small luminance values and the average of large luminance values of pixels arranged on both sides of the edge. In the group 912, the average (i.e., 41) of the average of the small luminance values (i.e., 21) and the average of the large luminance values (i.e., 61) of the pixels arranged on both sides of the edge is acquired as a first gradation threshold value. In the group 914, an average (i.e., 109) of the average of the small luminance values (i.e., 79) and the average of the large luminance values (i.e., 139) of the pixels arranged on both sides of the edge is acquired as a second gradation threshold value. In the present exemplary embodiment, the first average value as an average value of the small luminance values and the second average value as an average value of the large luminance values of pixels arranged on both sides of the edge are calculated for each group, and the third average value as an average value of the first and the second average values is acquired as a gradation threshold value. However, the calculation method is not limited thereto. For example, a median value (first median value) of the small luminance values and a median value (second median value) of the large luminance values of pixels arranged on both sides of the edge are calculated, and an average of the first and the second median values may be acquired as the gradation threshold value.

Figure 10:
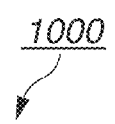
FIG. 10 is a table illustrating a gradation threshold value.

A table 1000 in FIG. 10 illustrates ranges of luminance values specified by the gradation threshold values set based on luminance values of pixels in vicinities of the edge. As illustrated in the table 1000, a range from 0 to 41 is a first range, a range from 42 to 109 is a second range, and a range from 110 to 255 is a third range. Gradation divisions in FIG. 10 are determined according to the method illustrated in FIG. 9C. The first gradation threshold value and the second threshold value are respectively specified as 41 and 109.

FIG. 11 is a flowchart illustrating an example of processing for determining a gradation threshold value based on information about pixels in a vicinity of the edge. Similar to the processing described in the third exemplary embodiment, the processing of this flowchart may be executed at any timing. The processing in FIG. 11 is executed by the functional blocks illustrated in FIG. 2 implemented by the CPU 1500 of the image capturing apparatus 110 executing a computer program stored in the ROM 1520 or the HDD 1530 of the information processing apparatus 100.

First, in step S1101, the extraction unit 204 acquires an attention pixel from an input image. The extraction unit 204 acquires an attention pixel by scanning the image from a pixel at an uppermost left end to a pixel at a right end, then moving to a pixel at a left end of a next row, and similarly scanning the image in the order from a pixel at the left end to a pixel at a right end, repeatedly. Then, the processing is ended when scanning of a pixel at a right end of a lowermost row is completed.

In step S1102, the extraction unit 204 calculates an edge intensity of the attention pixel through a method such as the Sobel filter. When the Sobel filter is used, edge intensities in the longitudinal direction and the lateral direction are acquired. In a case where the edge intensities calculated in step S1102 are predetermined values or more, in step S1103, the extraction unit 204 acquires luminance values of pixels arranged on both sides of the attention pixel in the longitudinal direction and the lateral direction. At this time, the acquired luminance values are stored in association with the edge intensities calculated in step S1102. Next, in step S1104, if not all of the pixels have been determined as the attention target (NO in step S104), the processing proceeds to step S1101. In step S1101, a next pixel is determined as the attention target. If all of the pixels have been determined as the attention target (YES in step S1104), the processing proceeds to step S1105. In step S1105, pixels remaining in step S1103, arranged on both sides of the edge, and having similar luminance values, are grouped. In step S1106, a first average value of smaller luminance values and a second average value of larger luminance values of pixels arranged on both sides of the edge are calculated for each group, and a third average value that is an average of the first and the second average values is set as a gradation threshold value.

As described above, in the present exemplary embodiment, a gradation threshold value is determined based on the edge information and the information about pixels in the vicinities of the edge of the input image. Through the above-described processing, a threshold value is determined so as to color-code a boundary between the objects, so that it is possible to generate an output image that allows the user to easily figure out a situation included in the captured image while protecting privacy.

In a fifth exemplary embodiment, a gradation threshold value is set based on pixel information of a skin color region in a captured image. Hereinafter, the information processing apparatus 100 according to the present exemplary embodiment will be described. In the following descriptions, a portion different from the exemplary embodiments described above will be mainly described, the same reference numerals are applied to the constituent elements and the processing similar or equivalent to those of the exemplary embodiments described above, and duplicative descriptions thereof will be omitted.

Figure 12A:
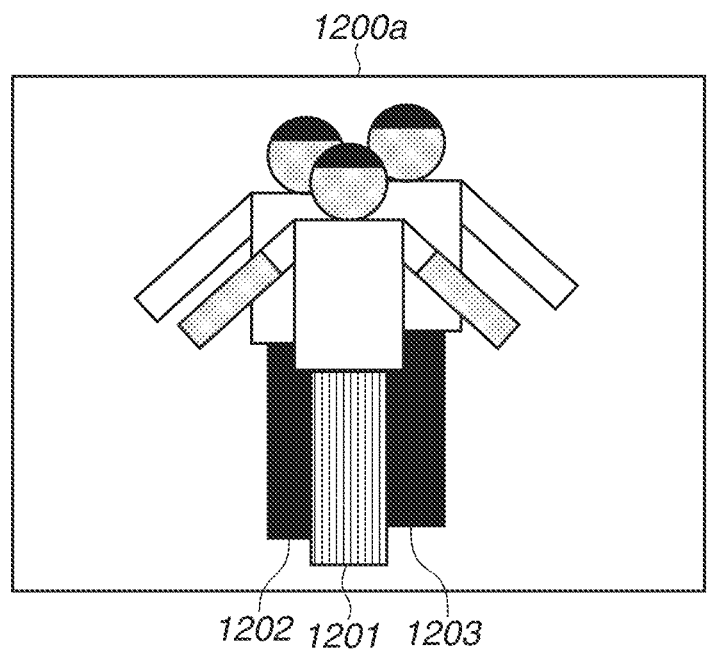
FIGS. 12A and 12B are diagrams illustrating processing for setting a gradation threshold value.
Figure 12B:
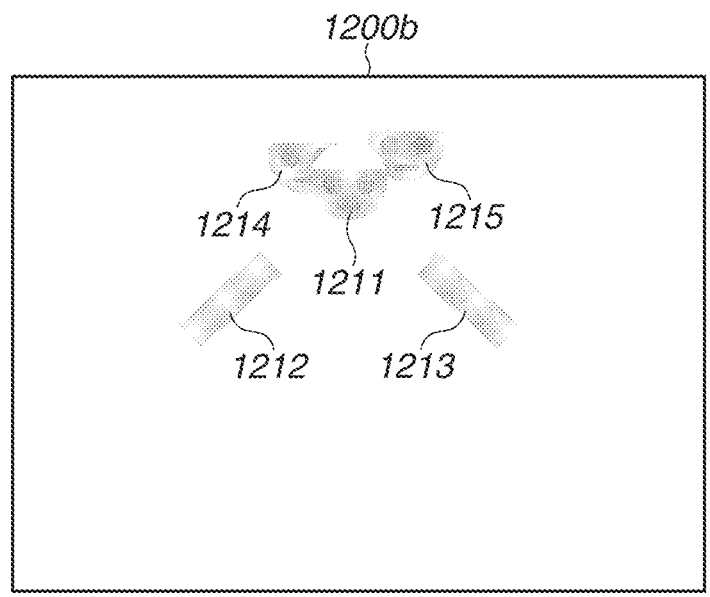

FIGS. 12A and 12B are diagrams illustrating an example of processing for extracting a skin color region from a captured image. More specifically, for example, the extraction unit 204 converts a pixel value of each pixel of a captured image 1200a in FIG. 12A expressed by the RGB values into a pixel value of a color space such as the YCbCr color space or the HSV color space and extracts a skin color region. FIG. 12B is a diagram illustrating a skin color region extracted from the captured image 1200a by the extraction unit 204. A region 1211 is a facial region of a person 1201. Similarly, a region 1214 is a facial region of a person 1202, and a region 1215 is a facial region of a person 1203. Regions 1212 and 1213 are regions of the arms of the person 1201. For example, a minimum luminance value and a maximum luminance value of the luminance values of the pixels in the extracted skin color region are respectively set as the gradation threshold values. In this way, the skin color region and the non-skin color region in the generated mask image are expressed by different colors.

As described above, the setting unit 203 of the present exemplary embodiment sets the gradation threshold values based on the luminance of the skin color region extracted from the captured image. Thus, in the generated mask image, a region of the person's skin and a region other than the skin region are expressed in different colors. Therefore, for example, in comparison to the mask image filled with a single color, which corresponds to many persons including overlapping persons extracted as a region of a mass of foreground objects, the generated mask image allows the user to recognize each of the persons while protecting privacy.

In a sixth exemplary embodiment, a mask image corresponding to a region specified in a captured image is generated in colors different depending on the luminance of the region. In the following description, a portion different from the exemplary embodiments described above will be mainly described, the same reference numerals are applied to the constituent elements and the processing similar or equivalent to those of the exemplary embodiments described above, and duplicative descriptions thereof will be omitted.

Figure 13:
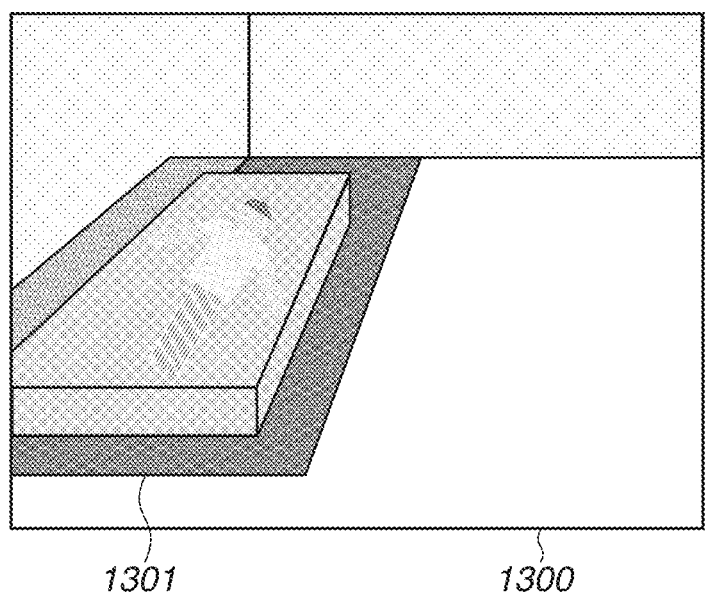
FIG. 13 is a diagram illustrating processing for generating a mask image.

When the information processing apparatus 100 receives an operation for specifying a region in a captured image, the setting unit 203 of the present exemplary embodiment sets the region (hereinafter, referred to as "specified region") specified with respect to the captured image. Then, the generation unit 205 of the present exemplary embodiment generates a mask image corresponding to the specified region, and having colors different depending on the luminance of the specified region. FIG. 13 is a diagram illustrating an output image 1300 generated by combining a mask image 1301 generated by the generation unit 205 of the present exemplary embodiment and the captured image. In the example illustrated in FIG. 13, a region including a bed in the captured image is specified as a specified region, and a mask image corresponding to that specified region is generated.

FIGS. 14A and 14B are flowcharts illustrating flows of processing for generating a mask image executed by the information processing apparatus 100 according to the present exemplary embodiment. The processing in FIGS. 14A and 14B are executed by the functional blocks illustrated in FIG. 2 implemented by the CPU 1500 of the image capturing apparatus 110 executing a computer program stored in the ROM 1520 of the information processing apparatus 100.

The processing in steps S501 and S502 in FIG. 14A is similar to the processing described in the first exemplary embodiment, so that descriptions thereof will be omitted. In step S1401, the generation unit 205 acquires information indicating a position of the specified region in the captured image set by the setting unit 203. In addition, a position of the specified region is expressed by XY coordinates of respective vertexes of the specified region when an upper-left end point of the captured image is set as an origin. Next, in step S1402, the generation unit 205 executes generation processing for generating a mask image corresponding to the foreground object region extracted by the extraction unit 204 in step S502 and the specified region, and having colors different depending on the luminance values of the foreground object region and the specified region. Now, generation processing according to the present exemplary embodiment executed in step S1402 will be described further in detail with reference to FIG. 14B.

In step S1411, the generation unit 205 determines a pixel as an attention target from a plurality of pixels of the captured image included in the foreground region extracted by the extraction unit 204 in step S502 or the specified region set by the setting unit 203. The processing in steps S512 to S516 is similar to the processing described in the first exemplary embodiment, so that descriptions thereof will be omitted. After the mask image is generated in step S516, in step S504, the combining unit 206 generates an output image to be displayed on a display unit by combining the mask image generated by the generation unit 205 and a predetermined image. Then, in step S505, the output control unit 207 outputs the output image generated by the combining unit 206 to an external device such as the recording device 120 or the display 130. In the present exemplary embodiment, the information processing apparatus 100 gradates both of pixels in the specified region and pixels in the foreground region through the same processing to generate the mask image. However, these pixels may be processed separately.

As described above, the information processing apparatus 100 according to the present exemplary embodiment generates a gradated mask image not only for the foreground region extracted from the captured image but also for the specified region in the captured image. In this way, a gradated mask image can be generated for a region that is not extracted as a foreground region.

Other Exemplary Embodiments

Next, a hardware configuration of the information processing apparatus 100 for achieving the functions described above in the respective exemplary embodiments will be described with reference to FIG. 15. Although a hardware configuration of the information processing apparatus 100 will be described below, the recording device 120 and the image capturing apparatus 110 are also implemented with a similar hardware configuration.

The information processing apparatus 100 according to the present exemplary embodiment includes a CPU 1500, a RAM 1510, a ROM 1520, a HDD 1530, and an I/F 1540.

The CPU 1500 is a central processing device that collectively controls the information processing apparatus 10. The RAM 1510 temporarily stores the computer program executed by the CPU 1500. Further, the RAM 1510 provides a work area used for the processing executed by the CPU 1500. The RAM 1510 further functions as a frame memory or a buffer memory.

The ROM 1520 stores a program executed by the CPU 1500 to control the information processing apparatus 100. The HDD 1530 is a storage device for storing image data. The I/F 1540 executes communication with an external apparatus via the network 140 according to a transmission control protocol/internet protocol (TCP/IP) or a hypertext transfer protocol (HTTP).

In the above-described exemplary embodiments, the processing is executed by the CPU 1500. However, at least a part of the processing executed by the CPU 1500 may be executed by dedicated hardware. For example, processing for displaying a graphical user interface (GUI) or image data on the display 130 may be executed by a graphics processing unit (GPU). Further, processing for reading a program code from the ROM 1520 and loading the program on the RAM 1510 may be executed by a direct memory access (DMA) that functions as a transfer device.

The present disclosure can be realized by processing in which a program for implementing the functions of the above-described exemplary embodiments is read and executed by one or more processors. The program may be supplied to a system or an apparatus including the processor via a network or a storage medium. Further, the present disclosure can be also implemented with a circuit (e.g., application specific integrated circuit (ASIC)) that implement one or more functions. Furthermore, respective units of the information processing apparatus 100 can be implemented by the hardware illustrated in FIG. 15 or can be implemented by software.

In addition, another apparatus may have one or more functions of the information processing apparatus 100 according to the above-described exemplary embodiments. Further, the above-described exemplary embodiments may be combined optionally.

Although the exemplary embodiments of the present disclosure have been described above, the above-described exemplary embodiments are merely examples embodying the present disclosure, and should not be construed as limiting the technical range of the present disclosure. In other words, the present disclosure can be realized in diverse ways without departing from the technical spirit or main features of the present disclosure. For example, any configuration in which the above-described exemplary embodiments are combined with each other is also included in the disclosure of the present specification document.

According to the above-described exemplary embodiments, it is possible to generate an output image that allows a user to easily figure out a situation captured in the image while protecting privacy.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-180970, filed Sep. 30, 2019, which is hereby incorporated by reference herein in its entirety.

What is claimed is:

1. An information processing apparatus comprising:
a hardware processor; and
a memory for storing instructions to be executed by the hardware processor, wherein, when the instructions stored in the memory are executed by the hardware processor, the information processing apparatus functions as:
an extraction unit configured to extract a foreground object region from a captured image captured by an image capturing unit,
a generation unit configured to generate a mask image corresponding to the foreground object region in the captured image and having colors different depending on a respective luminance value of each of divided regions of the foreground object region,
a combining unit configured to combine the mask image generated by the generation unit and a predetermined image to generate an output image, and
a setting unit configured to set a first luminance range and a second luminance range different from the first luminance range, wherein the first luminance range and the second luminance range do not overlap,
wherein, for each divided region of the divided regions of the foreground object region, the generation unit determines a first color as a color used for generating a region of the mask image corresponding to said divided region in a case where the respective luminance value of said divided region falls within the first luminance range, determines a second color different from the first color as a color used for generating the region of the mask image corresponding to said divided region in a case where the respective luminance value of the divided region falls within the second luminance range, and generates the region of the mask image corresponding to said divided region using the color determined for said divided region, and
wherein the setting unit extracts a region having a specific range of colors from the captured image, wherein the region having the specific range of colors includes one or more of the divided regions, and sets the first luminance range and the second luminance range depending on the minimum luminance value and the maximum luminance value of the respective luminance values of the one or more of the divided regions included in the region having the specific range of colors.

2. The information processing apparatus according to claim 1, wherein the combining unit combines the mask image generated by the generation unit and the captured image to generate the output image.

3. An information processing method comprising:
extracting a foreground object region from a captured image captured by an image capturing unit;
generating a mask image corresponding to the foreground object region in the captured image, and having colors different depending on a respective luminance value of each of divided regions of the foreground object region;
combining the mask image generated in the generating and a predetermined image to generate an output image; and setting a first luminance range and a second luminance range different from the first luminance range, wherein the first luminance range and the second luminance range do not overlap, wherein, for each divided region of the divided regions of the foreground object region, a first color is determined as a color used for generating a region of the mask image corresponding to said divided region in a case where the respective luminance value of said divided region falls within the first luminance range, a second color different from the first color is determined as a color used for generating the region of the mask image corresponding to said divided region in a case where the respective luminance value of said divided region falls within the second luminance range, and the region of the mask image corresponding to said divided region is generated using the color determined for said divided region, and wherein a region having a specific range of colors is extracted from the captured image, wherein the region having the specific range of colors includes one or more of the divided regions, and the first luminance range and the second luminance range are set depending on the minimum luminance value and the maximum luminance value of the respective luminance values of the one or more of the divided regions included in the region having the specific color range.

4. The information processing method according to claim 3, wherein, in the combining, the mask image generated in the generating and the captured image are combined to generate the output image.

5. The information processing method according to claim 3, further comprising displaying on a display unit the output image generated in the combining.

6. A non-transitory computer-readable storage medium storing computer executable instructions for causing a computer to execute a method comprising:

extracting a foreground object region from a captured image captured by an image capturing unit;

generating a mask image corresponding to the foreground object region in the captured image, and having colors different depending on a respective luminance value of each of divided regions of the foreground object region;

combining the mask image generated in the generating and a predetermined image to generate an output image; and setting a first luminance range and a second luminance range different from the first luminance range, wherein the first luminance range and the second luminance range do not overlap;

wherein, for each divided region of the divided regions of the foreground object region, a first color is determined as a color used for generating a region of the mask image corresponding to said divided region in a case where the respective luminance value of said divided region falls within the first luminance range, a second color different from the first color is determined as a color used for generating the region of the mask image corresponding to said divided region in a case where the respective luminance value of said divided region falls within the second luminance range, and the region of the mask image corresponding to said divided region is generated using the color determined for said divided region, and wherein a region having a specific range of colors is extracted from the captured image, wherein the region having the specific range of colors includes one or more of the divided regions, and the first luminance range and the second luminance range are set depending on the minimum luminance value and the maximum luminance value of the respective luminance values of the one or more of the divided regions included in the region having the specific color range.

* * * * *